United States Patent
Tropoloc

(10) Patent No.: US 6,884,075 B1
(45) Date of Patent: Apr. 26, 2005

(54) SYSTEM AND METHOD FOR COMMUNICATION OF CHARACTER SETS VIA SUPPLEMENTAL OR ALTERNATIVE VISUAL STIMULI

(76) Inventor: George A. Tropoloc, 1221 W. Airport Freeway, #113, Irving, TX (US) 75062

( * ) Notice: Subject to any disclaimer, the term of this patent is extended or adjusted under 35 U.S.C. 154(b) by 155 days.

(21) Appl. No.: 09/769,801

(22) Filed: Jan. 25, 2001

Related U.S. Application Data

(63) Continuation-in-part of application No. 09/439,414, filed on Nov. 11, 1999, now abandoned, which is a continuation of application No. 08/971,842, filed on Sep. 11, 1997, now abandoned.
(60) Provisional application No. 60/030,388, filed on Sep. 23, 1996.

(51) Int. Cl.[7] .............................. G09B 19/00
(52) U.S. Cl. ...................... 434/156; 434/159
(58) Field of Search ................ 434/156, 159, 434/167, 168, 176, 178, 188, 169

(56) References Cited

U.S. PATENT DOCUMENTS

| | | | |
|---|---|---|---|
| 3,464,124 A | * | 9/1969 | Lynd .......................... 434/170 |
| 3,482,333 A | * | 12/1969 | Trager ........................ 273/299 |
| 3,707,287 A | | 12/1972 | Spector |
| 3,768,177 A | | 10/1973 | Thomas |
| 3,777,414 A | | 12/1973 | Robinson |
| 3,813,471 A | | 5/1974 | Dean, III |
| 4,270,284 A | | 6/1981 | Skellings |
| 4,315,748 A | * | 2/1982 | Frascara et al. ............ 434/159 |
| 4,443,199 A | * | 4/1984 | Sakai ......................... 434/170 |
| 4,613,309 A | * | 9/1986 | McCloskey ................. 434/170 |
| 4,643,683 A | * | 2/1987 | Orsini et al. ................ 434/403 |
| 4,655,713 A | * | 4/1987 | Weiss ......................... 434/178 |
| 4,713,008 A | * | 12/1987 | Stocker et al. .............. 434/167 |
| 4,936,780 A | | 6/1990 | Cogliano |
| 4,968,255 A | | 11/1990 | Lee |
| 5,013,245 A | * | 5/1991 | Benedict ...................... 434/170 |
| 5,018,974 A | | 5/1991 | Carnahan et al. |
| 5,265,878 A | | 11/1993 | Kim |
| 5,269,691 A | | 12/1993 | Waldman |
| 5,312,257 A | | 5/1994 | Tarvin et al. |
| 5,487,670 A | * | 1/1996 | Leonhardt ................... 434/167 |
| 5,567,159 A | * | 10/1996 | Tehan ......................... 434/178 |
| 5,727,946 A | | 3/1998 | Rosen |
| 5,783,767 A | | 7/1998 | Shinsky |
| 6,022,222 A | * | 2/2000 | Guinan ........................ 434/169 |
| 6,077,080 A | * | 6/2000 | Rai ............................. 434/159 |

OTHER PUBLICATIONS

United States Patent and Trademark Office Cover Sheet for Patent No. 1732980, Mooney, Oct. 1929—Blank Website Image Page, USPTO.
United States Patent and Trademark Office Cover Sheet for Patent No. 1428456, Stranders, Sep. 1922—Blank Website Image Page, USPTO.
U.S. Appl. No. 60/030,388 George A. Tropoloc Sep. 23, 1996.
U.S. Appl. No. 08/971,842, Tropoloc, filed Sep. 11, 1997.
U.S. Appl. No. 09/439,414, Tropoloc, filed Nov. 11, 1999.

* cited by examiner

*Primary Examiner*—Kurt Fernstrom
(74) *Attorney, Agent, or Firm*—Fulbright & Jaworski LLP

(57) ABSTRACT

The present invention relates generally to the representation of a characters or language constructs via supplemental or alternative visual stimuli. The present invention may be utilized to augment language acquisition via spelling or foreign language tutorials by associating unique colors with traditional representation of the language constructs. Additionally, the present invention may be utilized to implement computer scanning applications by representation of language constructs via unique colors and a simple geometric shape.

29 Claims, 3 Drawing Sheets

FIG. 2
| RGB STATE | CHARACTER |
|---|---|
| (0,0,0) | A |
| (0,0,1) | B |
| (0,0,2) | C |
| (0,1,0) | D |
| (0,1,1) | E |
| (0,1,2) | F |
| (0,2,0) | G |
| (0,2,1) | H |
| (0,2,2) | I |
| (1,0,0) | J |
| (1,0,1) | K |
| (1,0,2) | L |
| (1,1,0) | M |
| (1,1,1) | N |
| (1,1,2) | O |
| (1,2,0) | P |
| (1,2,1) | Q |
| (1,2,2) | R |
| (2,0,0) | S |
| (2,0,1) | T |
| (2,0,2) | U |
| (2,1,0) | V |
| (2,1,1) | W |
| (2,1,2) | X |
| (2,2,0) | Y |
| (2,2,1) | Z |
| (2,2,2) | . |
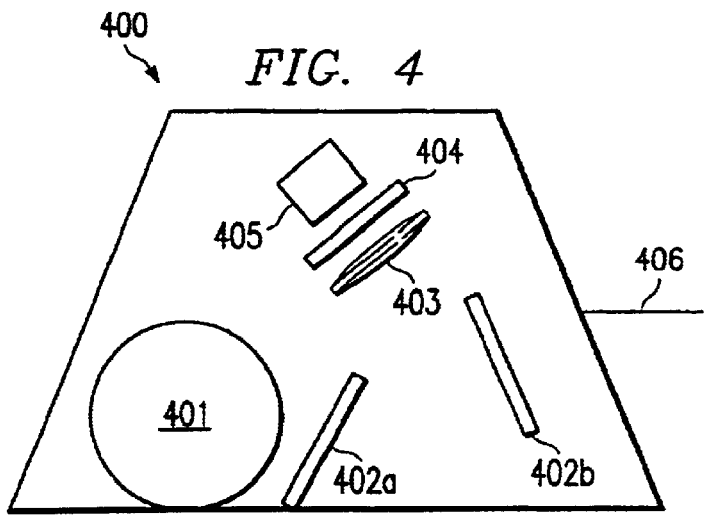
FIG. 4
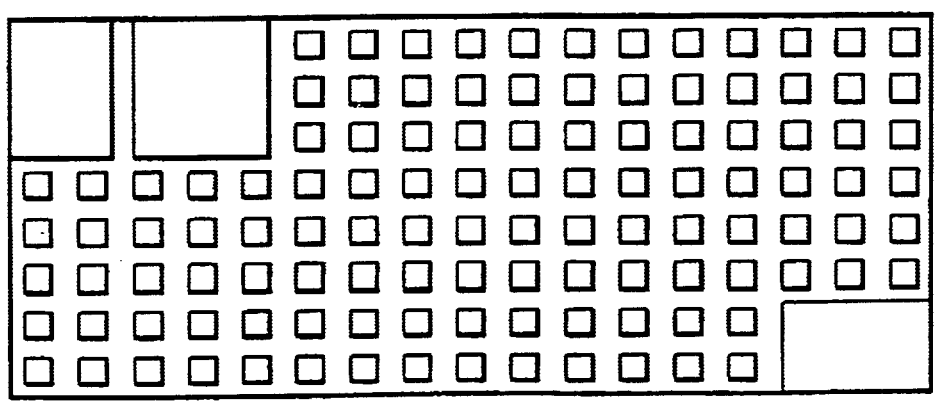
FIG. 3

SYSTEM AND METHOD FOR COMMUNICATION OF CHARACTER SETS VIA SUPPLEMENTAL OR ALTERNATIVE VISUAL STIMULI

RELATED APPLICATIONS

The present invention is a continuation-in-part of U.S. patent application Ser. No. 09/439,414, entitled "COLOR CODED ALPHA-NUMERICS MUSICAL NOTES, AND SYMBOLS," (filed Nov. 11, 1999, now abandoned) the disclosure of which is incorporated herein by reference, which was a continuation of U.S. patent application Ser. No. 08/971,842 (filed Sep. 11, 1999, now abandoned), entitled "COLOR CODED ALPHA-NUMERICS MUSICAL NOTES, AND SYMBOLS," which is incorporated herein by reference, which claimed the priority of U.S. Provisional Application No. 60/030,388 (filed Sep. 23, 1996)

TECHNICAL FIELD

The present invention relates generally to the representation of characters or language constructs via supplemental or alternative visual stimuli and more particularly to a unique color encoding scheme to facilitate computer applications such as language tutorials and scanning applications.

BACKGROUND

Traditionally, information associated with a character set has been represented through distinguishing shapes. This approach is universally accepted as the exclusive communication mechanism of written languages. Specifically, written alphabets are defined by varied shapes. The association of other visual stimuli with written character sets to convey information is quite limited.

Specifically, color is not utilized as a primary communication mechanism. Instead, color as a visual stimuli has only been utilized in very limited circumstances. Of course, children's toys have utilized various color alphabet characters. For example, color letters have been imprinted on toy blocks. The colors are only meant to provide an interesting visual stimuli to attract a child's attention. The colors are not intended and do not provide information of any kind. Specifically, the same color is utilized in association with different alphabet characters, rather than each character being assigned a unique color. Accordingly, the colors do not aid the perceptive learning experience of a child.

Also, colors have been utilized to distinguish between vowels and consonants. For example, various teaching tools have associated a single color with consonants and another single color with vowels. However, the use of color to convey information is quite simplistic. The colors are merely utilized as a secondary communication mechanism which involve very limited information. For example, seeing a color assigned to a vowel without recognizing the exact latter merely allows one to determine that the letter is a vowel, but does not allow one to determine the specific letter.

The limited use of color is not limited to communication methods associated with individuals. For example, color has not been utilized to convey information in scanning applications other than the represented color itself. It is possible to scan a photograph to create an RGB bitmap representation. However, the RGB encoded information merely reflects colors present in the photograph. The RGB encoded information is not utilized to convey other information, such as numbers, letters, words, or other language constructs.

Also, scanning operations such as bar code readers rely upon shaped visual indicia to convey information. Specifically, bar code readers utilize varying thickness of lines to convey information. Also, optical character recognition systems rely solely upon varied shapes to perform the optical character correlation process.

SUMMARY OF THE INVENTION

The present invention is directed to a system and method that facilitates communication of language constructs (in particular alpha-numerical characters) via limited spatial representations. In particular, the present invention preferably omits representation of language constructs such as shaped alpha-numerical characters by utilizing a color associated with a symbol such as a line, dot, box, or any simple shape. Alternatively, language constructs may be represented by associating colors with shapes that lack any appreciable definition such as an ink-blot. In a preferred embodiment, the present invention assigns a unique color to each symbol of a character set. For example, a unique color may be assigned to each letter in the alphabet. Alternatively, a unique color may be associated with each Arabic numeral (0–9) or each hexadecimal numeral (0–F). Furthermore, in an alternative embodiment, the unique colors assigned to characters of a character set are utilized in addition to typical representations of the characters of the character set.

The present invention may be utilized in any number of practical applications. For example, the present invention may associate a unique color with each letter of the alphabet. A set of writing instruments, such as crayons or markers, may provide each unique color. The writing instruments may have the respective letters of the alphabet imprinted thereon. Children may utilize the writing instruments in connection with coloring books that comprise various spelling lessons. After developing an association between a color and a letter, children may utilize a computer implemented spelling program. The program may provide a graphical representation (such as a representation of a cat or dog) and prompt a child to type in the various letters of the represented object via "fill-in-the-blanks." If a child enters an incorrect letter, the computer program may provide visual stimuli to help the child. For example, the represented object may be successively changed in color. Alternatively, various entries of the "fill-in-blanks" prompt may be presented via the respective color of the given letter. Additionally, various keys of the computer keyboard may be respectively assigned unique colors to facilitate the learning process.

The present invention may be applied to any number of practical applications. Examples of such applications are provided in U.S. patent application Ser. No. 09/439,414, entitled "COLOR CODED ALPHA-NUMERICS, MUSICAL NOTES, AND SYMBOLS," the disclosure of which is incorporated herein by reference. For example, the present invention provides numerous other advantages for other applications, such as computer recognition of identifier indicia. For example, color association may be advantageously utilized with optical scanning applications. Specifically, unique color states may be associated with various characters or other language constructs. The unique color states may be imprinted on a computer-readable indicia for processing by a scanning application.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 2 depicts an exemplary table mapping unique RGB states to letters;

FIG. 3 depicts a preferred embodiment of computer readable indicia;

FIG. 4 depicts an illustrative scanner for scanning a color-coded computer readable indicia.

DETAILED DESCRIPTION

The present invention is directed to a system and method that facilitate communication of characters or language constructs. The present invention provides supplemental or alternative visual stimuli to augment processing of characters or other language constructs. In particular, alpha-numerical data may be represented via limited spatial representations. In a preferred embodiment, the present invention omits representation of language constructs by shaped characters. Instead, the language constructs may be represented utilizing unique colors associated with a symbol such as a line, dot, box, or any simple shape. Alternatively, language constructs may be represented by associating colors with shapes that lack any appreciable definition such as an ink-blot. In a preferred embodiment, the present invention assigns a unique color to each symbol of a character. For example, a unique color may be assigned to each letter in the alphabet. Alternatively, a unique color may be associated with each Arabic numeral (0–9) or each hexadecimal numeral (0–F).

Figure 1:
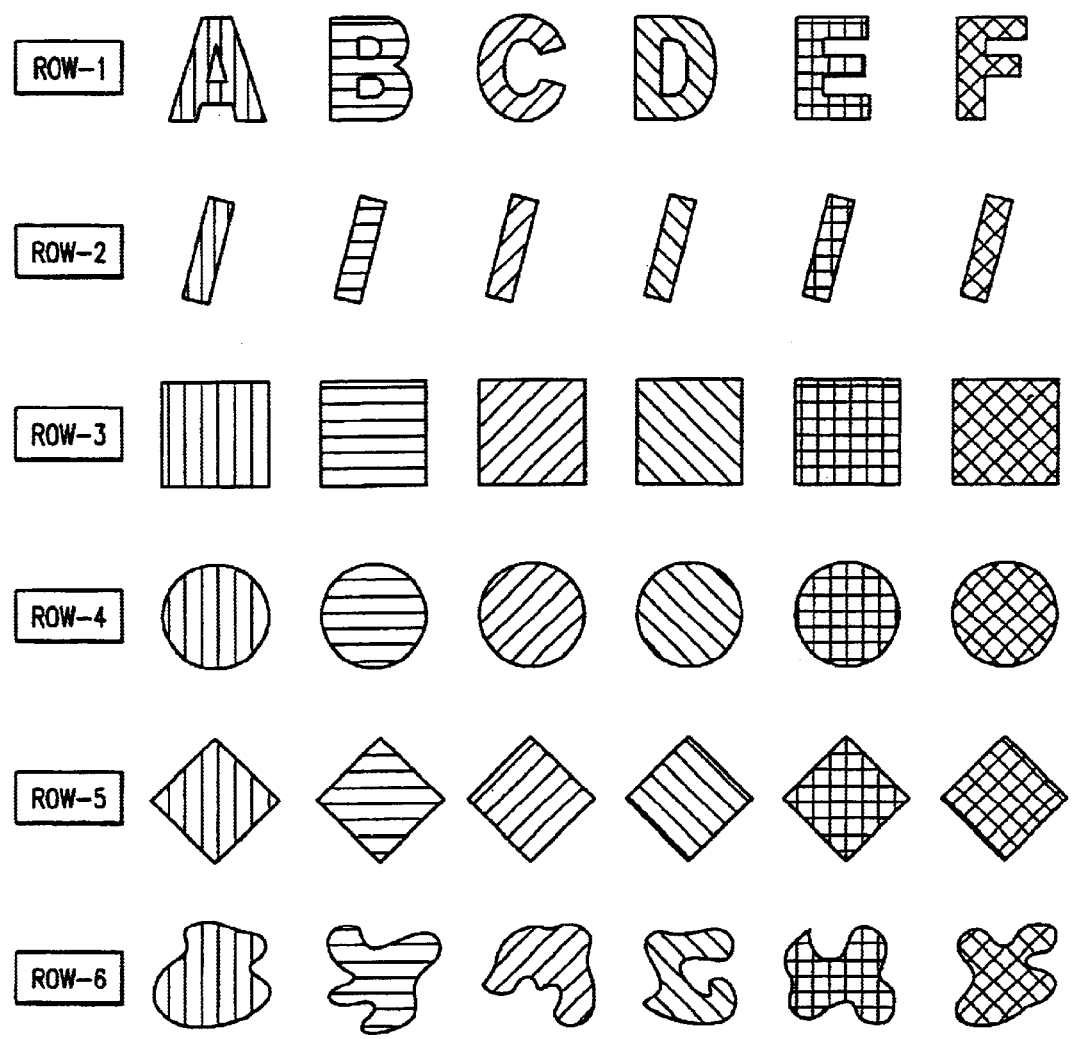
FIG. 1 depicts an exemplary table illustrating assignment of unique colors to a character set and illustrating the representation of a character set without characters distinguished by shape.

FIG. 1 depicts exemplary representation of a character set utilizing unique colors in addition to or in lieu of character elements distinguished by shape. For example, row 1 illustrates a number of letters (A–F). Each of the letters are uniquely associated with a specific color. Additionally, the characters of the alphabet are also represented utilizing the typical shaped constructs. However this information is redundant, since the letters are also represented by their typical shapes. Such redundancy of visual information may be valuable. Specifically, the redundancy of visual information provides a significant perceptual correlation between characters and respective colors. For example, this perceptual correlation may be advantageously utilized for language instruction for children or even non-English speaking adults.

The advantages of creating an additional perceptual correlation via supplemental or alternative stimuli may be observed through the use of an exemplary application. For example, unique colors may be assigned to each alpha-numeric character to be utilized on an automobile license plate. If portions of certain characters are partially obscured, each alpha-numerical character of the license plate may be ascertained via reference to the unique colors of the characters. As another example, unique colors may be assigned to street address numbers allowing simplified identification of street addresses by motorists on a passing street. These examples are intended to present the practicality of the redundancy of information. Specifically, the redundancy of information allows a character, symbol, or language construct to be uniquely determined even if a portion of the character, symbol, or language construct is obscured so long as a sufficient portion is accessible to determine the respective color. Of course, the present invention is not intended to be limited to such exemplary applications.

However, the redundancy of information is not required. In fact, the language constructs may be represented as simple objects void of distinguishing shapes. For example, rows 2–5 respectively depict characters (A–F) as dashes, boxes, circles, and diamonds of uniquely assigned colors. It is clear that the shapes are not intended to be exclusive. Any shape may be utilized to represent characters via unique colors. For example, row 6 represents various characters by associating colors with different shapes that do not possess any appreciable definition. This may provide a degree of security for coded messages. Specifically, messages may be encoded such that there is no correlation between the shapes utilized and the represented language construct. Thus, individuals who are not familiar with the encoding method will experience greater difficulty in ascertaining the represented information.

It shall be appreciated that representation of characters through unique colors may essentially define an abstract alphabet. Specifically, the letters of a given language may be represented without reference to any definable shapes. Therefore, language constructs may be communicated utilizing any number of arbitrary mechanisms and alternative visual stimuli. For example, a corporate entity may create a multi-color corporate logo with each color of the logo representing one letter of its corporate name. Alternatively, language constructs may be communicated by flashing a series of colors via a computer screen or other illumination system.

The present invention may be utilized in any number of practical applications. For example, the present invention may associate a unique color with each letter of the alphabet. A set of writing instruments, such as crayons or markers, may provide each unique color. The writing instruments may have the respective letters of the alphabet imprinted thereon. Children may utilize the writing instruments in connection with coloring books that comprise various spelling lessons. After developing an association between a color and a letter, children may utilize a computer implemented spelling program. The program may provide a graphical representation (such as a representation of a cat or dog) and prompt a child to type in the various letters of the represented object via "fill-in-the-blanks." If a child enters an incorrect letter, the computer program may provide visual stimuli to help the child. For example, the represented object may be successively changed in color. Alternatively, various entries of the "fill-in-blanks" prompt may be presented via the respective color of the given letter. Additionally, various keys of the computer keyboard may be respectively assigned unique colors to facilitate the learning process.

It shall be appreciated that the present invention is not limited to representation of alphabet characters by unique colors. Instead, the present invention may be applied to other language constructs, such as phonics. Phonics are distinct sounds that form the basis of spoken language. A unique color may be assigned to each phonic of a particular language. The unique assignment of colors to phonics may be utilized to teach various foreign languages. A tutorial may be utilized to facilitate foreign language instruction. For example, the various letters of a word may be divided into groups that correspond to the particular phonics of the word. Each group of letters may be displayed utilizing the specific color assigned to the particular phonic. By doing so, an additional visual stimuli is provided that will greatly facilitate the learning process associated with foreign language acquisition. It shall be appreciated that this additional visual stimuli is especially valuable for aiding the acquisition of English as a second language. Specifically, the English language utilizes numerous letter combinations to form the same phonics. Accordingly, the use of unique colors will greatly reduce the amount of time necessary for a non-English speaking person to acquire the English language.

Alternatively, foreign language acquisition may be facilitated by assigning unique colors to two related alphabets of distinct languages. For example, the Greek and English language alphabets possess structural similarities. However, it is clear that the spatial representation of the two alphabets is quite distinct. Accordingly, acquisition of the Greek language by an English-speaking person may be facilitated by assigning a unique color to related characters of both languages. Similarly, the acquisition of the English language by a Greek-speaking person may be facilitated. For example, the same distinct color may be assigned to both the English letter "a" and the Greek letter "α."

In addition, the present invention provides numerous other advantages for other applications such as computer recognition of identifier indicia. Specifically, known computer scanning systems and associated optical character recognition algorithms present a number of difficulties. Such systems provide very inaccurate results if the optical image is distorted in any way. Alternatively, such systems may not function at all if the optical image is distorted. Contaminants on a scanned object or document will significantly reduce the readability of the scanned image. The sensitivity to distortion or contaminants is in part related to the geometric complexity of known scanning systems. Specifically, a significant amount of computational complexity is required to detect the difference between certain letters (for example, the letters "N" and "M"). Alternatively, detecting varying widths of bar codes proves problematic if the geometric spacings are too small. To compensate for the potential inaccuracy, known optical recognition systems utilize very large scanning areas. Thus, the amount of information that may be scanned from a limited area is significantly restrained by known scanning applications if a high degree of accuracy is desired.

In an alternate embodiment of the present invention, a set of characters or other language constructs are represented by unique colors to implement a computer scanning application. Unique color assignment is utilized to preferably represent twenty-seven discrete states. The color assignment scheme may be utilized to represent the twenty-six characters utilized by the English language. The additional state may be utilized to convey a punctuation character—for example a period or a space. Of course, other punctuation characters may be represented as desired. To represent the twenty-seven states of this alternative embodiment, colors are represented by the following color division scheme. First, three states are represented by utilizing red, green, or blue encoding. Secondly, three other states are associated with a gray scale. Specifically, the brightness of the discrete color components is varied between three states. This permutation of states produces a total number of twenty-seven possible states.

For example, the letter "A" may be presented by associating it with the following RGB state: (0, 0, 0). This may be detected by applying a red filter to the respective color and detecting the gray level associated with the color. By applying a red filter to the preceding color state, a gray scale of 0 will be induced. Also, a green filter may be applied to the color providing a gray scale of 0. Finally, a blue filter may be applied to the color providing a gray scale of 0. An exemplary mapping of color states to letter is provided in FIG. 2. It shall be appreciated that the exemplary mapping is illustrative. Any number of equivalent mapping systems may be utilized in lieu of the exemplary mapping structure. Also, any number of states may be assigned via various unique colors. Moreover, any other character set may be similarly represented. For example, the character set defined by the ASCII standard may be represented by an expanded set of color states. Also, it shall be appreciated that various characters of the character set may represent control characters to provide desired functionality (i.e., a carriage return, tab setting, and/or the like).

It shall be appreciated that a data structure may be implemented in computer memory to facilitate such association of color states with letters or other language constructs. For example, an array structure, a series of pointers, a table, a matrix and/or the like may be utilized to facilitate association.

A preferred embodiment of scanning application indicia is depicted in FIG. 3. Indicia 300 depicts a plurality of rows and columns of character shapes. In this embodiment, each character is represented by the same shape—namely, a square. Furthermore, indicia 300 disposes two disproportionately shaped squares at the top right-hand corner. Also, indicia 300 disposes one disproportionately shaped square at the bottom-left hand corner. Indicia 300 utilizes this asymmetric configuration to allow a scanning application to easily determine the beginning and end of the data.

Moreover, the three disproportionately sized squares are preferably given by the state associated with the respective brightest levels associated with the red, green, and blue components. For example, the first disproportionately sized box may be created utilizing the brightest level of red. Similarly, the second disproportionately sized box may be created utilizing the brightest level of green and the third box may be created utilizing the brightest level of blue. Thus, indicia 300 may provide baseline brightness values to facilitate scanning detection. Specifically, this allows a scanning application to detect discrete states without rigidly specifying the various color states. Instead, the color states may be specified by relative or scaled values. By doing so, software operating on a personal computer and/or the like may be utilized to create indicia 300 via various color printers or other hardware units without ensuring that each printer or hardware unit produces the exact same colors.

Each of the smaller squares is preferably encoded via the preceding RGB mapping scheme to encode a particular letter or state. Additionally, it is preferred to utilize a high contrast background. For example, it is preferred to utilize a high intensity shade of white for the background. By providing a significant contrast between the background and the discrete squares, optical scanning systems may accurately detect the bounds of each simple geometric shape.

It shall be appreciated that the preceding scanning configuration provides a significant advantage over known scanning systems. Specifically, known bar coding scanning systems require a significant area to represent a smaller number of states. Typically, universal product code (UPC) bar coding applications only utilize 12–16 characters with ten states per character. In contrast, the preceding configuration of indicia 300 provides a much larger number of characters or language constructs that may be disposed within the same amount of space. Also, the preceding configuration provides a much a larger number of character or language construct states.

In an alternative embodiment, sufficient RGB states may be utilized to represent other language constructs in lieu of individual letters. Specifically, a number of RGB states may be utilized to represent a limited vocabulary of words. This embodiment may rely upon the ability of an optical detector to ascertain a greater range of values that possible by human visual perceptive abilities. In an embodiment representing words via discrete RGB states, eight states are preferably associated with each discrete color component (eight with red; eight with green; and eight with blue). The use of eight discrete states is preferred, since many commercially available analog to digital converters utilize eight bit encoding. By utilizing this approach, 512 RGB states are possible. Accordingly, this approach provides a limited, although substantially robust vocabulary, that may be encoded via a computer readable indicia.

In this embodiment, indicia 300 may be utilized to provide information for any number of applications. For example, indicia 300 may be utilized to provide detailed shipping instructions. Indicia 300 may encode detailed information for the use of certain pharmaceuticals. Indicia 300 may encode information regarding electronic component specifications, manufacturing material details, chemical compositions, and/or the like. Additionally, similar scanning applications may provide a large amount of information over minimal surface area. For example, document storage and retrieval in association with optical scanning may be facilitated by utilizing a similar encoding scheme.

FIG. 4 depicts an illustrative scanner for scanning a color-coded computer readable indicia. Scanner 400 includes an illumination sub-system 401 to illuminate an indicia such as indicia 300. Scanner 400 further includes a series of mirrors (402a and 402b) to direct image light toward lens 403. Mirrors 402a and 402b are preferably automatically adjustable to facilitate receipt of image light from a significant surface area. Lens 403 focuses image light onto CCD array 404. Also, lens 403 may perform image reduction if desired. CCD array 404 preferably comprises red, blue, and green filters. CCD array 404 converts the received image into an electrical signal. CCD arrays are charge-coupled devices which perform optical detection. CCD arrays are well known in the art of optical detection and are utilized in numerous devices from camcorders to digital cameras. The electrical signal produced by image capturing is converted to digital data via A/D converter 405.

The digital data may be outputted via output 406 to be processed by an external system such as a personal computer. The computer system may analyze the digital data to determine the orientation asymmetry by detecting the disproportionately sized squares. This allows the computer system to determine a starting point and an ending point. Secondly, the computer system may determine scaling values associated with the brightest levels of the discrete color components. The computer system then detects each language construct. The detection of each language construct begins by locating the respective, simple geometric shapes. In this context, simple geometric shape means a shape that is easily detectable by an optical detection protocol as distinguished from complex shapes such as traditional representations of letters. The location step is facilitated by the high contrast background. Secondly, the RGB values of the various geometric shapes are compared against the scaling values. The comparison is utilized to perform a look-up against a table of language constructs. It shall be appreciated that various steps of the detection process may be alternatively implemented within scanner 400 through the use of an on-board processor operating under a set of executable instructions or through the use of an application specific integrated circuit (ASIC). The results may be stored in a file or presented to a user.

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 5:
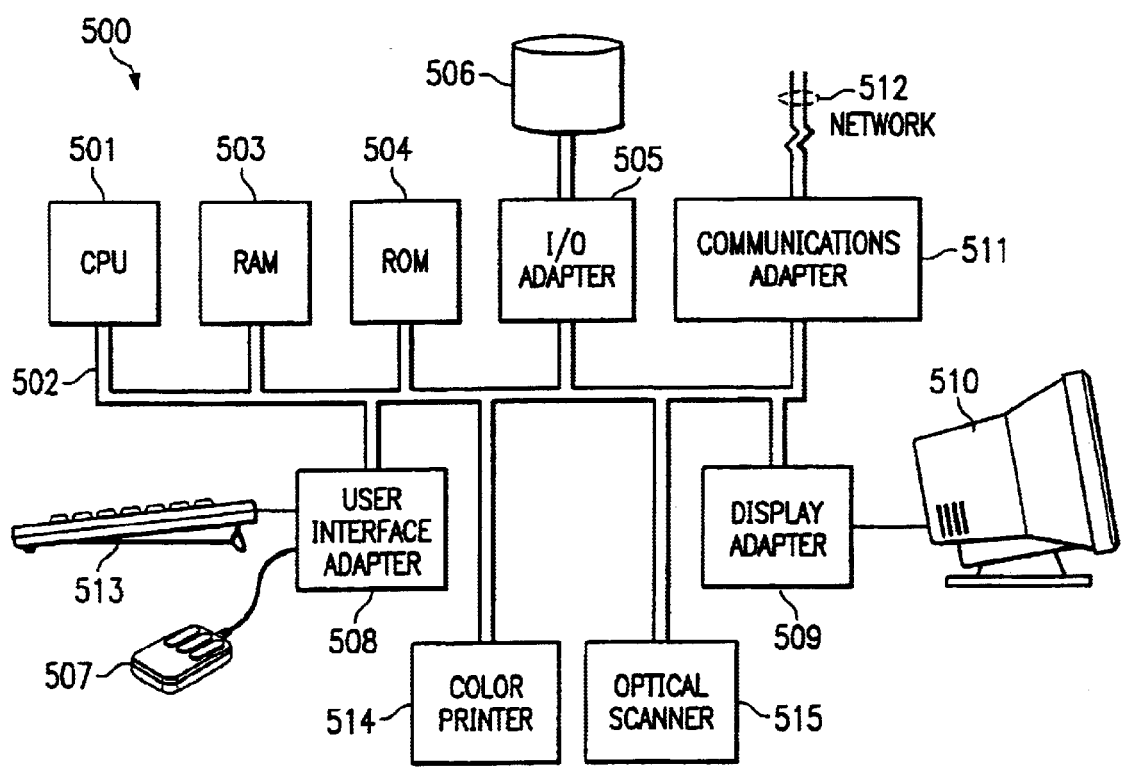
FIG. 5 depicts a block diagram of a computer system which is adapted to use the present invention.

FIG. 5 illustrates computer system 500 adapted to use the present invention. Computer system 500 may implement any portion or embodiment of the present invention. Computer system 500 may implement language tutorials via appropriate executable instructions stored in non-volatile memory. Alternatively, computer system 500 may create computer readable indicia via appropriate executable instructions stored in non-volatile memory. Computer system 500 may also implement scanning applications that recover language constructs encoded upon a computer readable indicia via appropriate executable instructions stored in non-volatile memory.

Central processing unit (CPU) 501 is coupled to system bus 502. The CPU 501 may be any general purpose CPU such as an Intel Pentium processor. However, the present invention is not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

Bus 502 is also coupled to input/output (I/O) controller card 505, communications adapter card 511, user interface card 508, and display card 509. The I/O card 505 connects to storage devices 506, such as one or more of hard drive, CD drive, floppy disk drive, tape drive, to the computer system. Communications card 511 is adapted to couple the computer system 500 to a network 512, which may be one or more of telephone network, local (LAN) and/or wide-area (WAN) network, Ethernet network, and/or Internet network. User interface card 508 couples user input devices, such as keyboard 513 and pointing device 507, to the computer system 500. The display card 509 is driven by CPU 501 to control the display on display device 510. System 500 further comprises color printer 514 that may be utilized to print computer readable indicia System 500 further comprises optical scanner 515 which may be utilized to digitize computer readable indicia.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communicating language constructs comprising the steps of:
    scanning a plurality of scaling symbols of a computer readable indicia to determine baseline values associated with respective chromatic components utilized to encode information on said computer readable indicia;
    scanning a plurality of language construct symbols of said computer readable indicia to determine respective encoding levels for each chromatic component for each of a plurality of language construct symbols;
    comparing the baseline values of the respective chromatic components to said encoding levels to determine a chromatic state of each of said plurality of language construct symbols; and
    mapping each of said chromatic states to a respective language construct to decode said computer readable indicia.

2. The method of claim 1, further comprising:
    scanning asymmetric orientation symbols of said computer readable indicia to determine at least one of a beginning point and an ending point.

3. The method of claim 1 wherein said plurality of language construct symbols are disposed in a plurality of rows and columns of said computer readable indicia.

4. The method of claim 1 wherein said plurality of language construct symbols encodes letters.

5. The method of claim 1 wherein said plurality of language construct symbols encodes words.

6. The method of claim 1 wherein said plurality of language construct symbols encodes product information.

7. The method of claim 1 wherein said plurality of language constructs encodes chemical composition information.

8. A system for communicating language constructs comprising the steps of:
    means for determining baseline values associated with respective chromatic components of a computer readable indicia, wherein said chromatic components are utilized to encode information on said computer readable indicia;
    means for determining respective encoding levels for each chromatic component for each language construct symbol of said plurality of language constructs symbols;
    means for comparing the baseline values of the respective chromatic components to said encoding levels to determine a chromatic state of each of said plurality of language constructs symbols; and
    means for mapping each of said chromatic states to a respective language construct to decode said computer readable indicia.

9. The system of claim 8 further comprising:
    means for determining at least one of a beginning point and an ending point by analysis of asymmetric orientation symbols of said computer readable indicia.

10. The system of claim 8 wherein said plurality of language construct symbols are disposed in a plurality of rows and columns of said computer readable indicia.

11. The system of claim 8 wherein said means for mapping determines respective letters encoded by said plurality of language construct symbols.

12. The system of claim 8 wherein said means for mapping determines respective words encoded by said plurality of language construct symbols.

13. A method for representing language constructs;
    assigning a unique color to each letter of an alphabet; and
    communicating letters of said alphabet in terms of said assigned unique colors without utilizing unique geometric shapes to represent said letters of said alphabet, wherein said communicating letters is implemented in a computer-aided language tutorial.

14. The method of claim 13 wherein said communicating letters of said alphabet occurs when a user of said computer-aided language tutorial enters information in response to a prompt from said computer-aid language tutorial to enter a word.

15. The method of claim 14 wherein said prompt is a display of an object for a word that the user spells in response to said prompt.

16. The method of claim 15 further comprising:
    changing a color of said object to the respective unique color associated with a letter to be entered for said word.

17. The method of claim 16 wherein said changing a color occurs when the user enters an incorrect letter.

18. A computer system for providing a language tutorial, comprising:
    means for associating a unique color with each letter of an alphabet;
    means for receiving user input identifying a letter of said alphabet;
    means for prompting a user to enter letters of said alphabet during presentation of said language tutorial to said user; and
    means for displaying a respective unique color that is associated with a letter currently expected by said language tutorial.

19. The computer system of claim 18 wherein said means for displaying operates after said user enters an incorrect letter in response to said means for prompting.

20. The computer system of claim 18 wherein said means for displaying displays a graphical object to identify a word to be entered by said user.

21. The computer system of claim 20 wherein said means for displaying a respective unique color causes said graphical object to be displayed using the respective unique color that is associated with the letter expected by the language tutorial.

22. The computer system of claim 18 wherein said language tutorial is a foreign language tutorial.

23. The computer system of claim 22 wherein said means for associating a unique color with each letter of an alphabet associates a unique color with each letter of an alphabet of a first language, said system further comprising:

means for associating a unique color with each letter of an alphabet of a second language such that letters of said alphabet of said second language are associated with the same unique color associated with a related letter of said alphabet of said first language.

24. The computer system of claim 18 wherein said means for receiving is a keyboard that has each key, associated with a letter of said alphabet, including its respective unique color.

25. A computer readable medium including executable instructions for a language tutorial, said computer readable medium comprising:

code for associating a unique color with each letter of an alphabet;

code for prompting a user to enter letters of said alphabet during presentation of said language tutorial to a user; and code for displaying a respective unique color to said user that is associated with a letter currently expected by said language tutorial.

26. The computer readable medium of claim 25 wherein said code for displaying is operable when said user incorrectly enters a letter during said language tutorial.

27. The computer readable medium of claim 25 wherein said code for displaying displays a graphical object to identify a word to be entered by said user.

28. The computer readable medium of claim 27 wherein said code for displaying changes a color of said graphical object according to the respective unique color that is associated with the letter currently expected by said language tutorial.

29. The computer readable medium of claim 27 wherein said language tutorial is a foreign language tutorial.

* * * * *